Oct. 31, 1967   A. U. HAANES   3,350,087
SELF-CONTAINED RECIPROCATORY HYDRAULIC SPRING
Filed Oct. 21, 1965
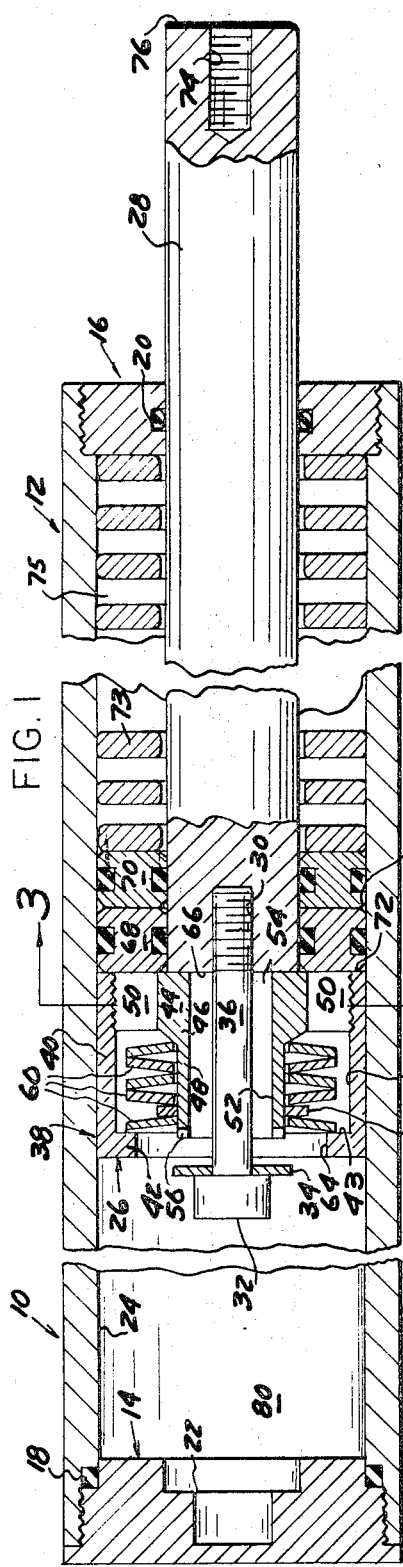
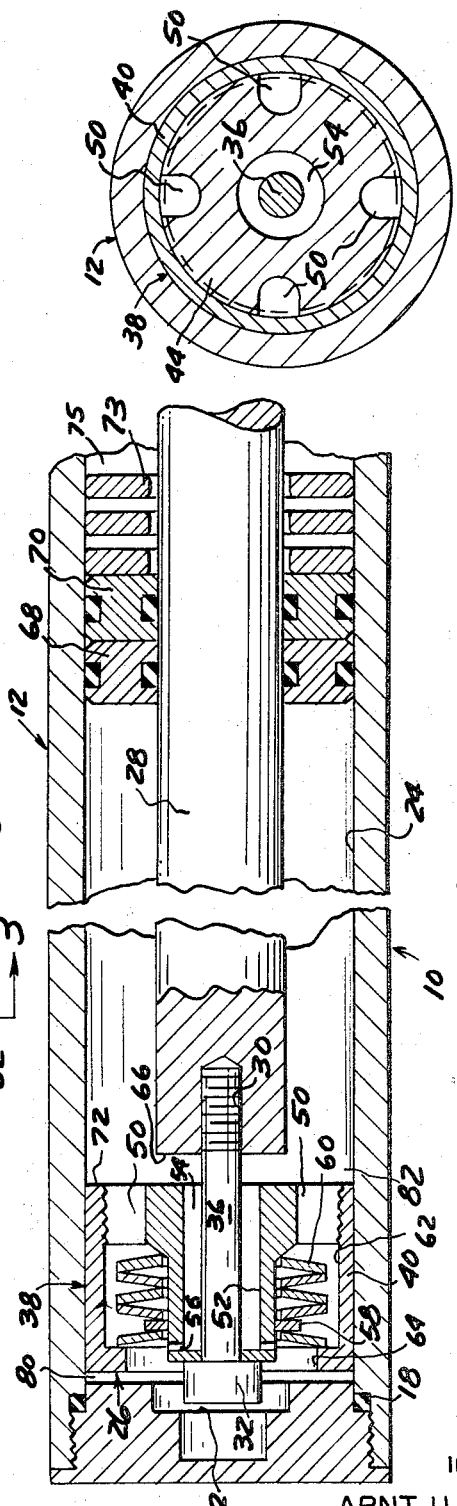
INVENTOR
ARNT U. HAANES
BY Barthel & Bugbee
ATTORNEYS ived Oct. 31, 1967

United States Patent Office
3,350,087
Patented Oct. 31, 1967

3,350,087
SELF-CONTAINED RECIPROCATORY
HYDRAULIC SPRING
Arnt U. Haanes, 522 S. Laurel Ave.,
Royal Oak, Mich. 48067
Filed Oct. 21, 1965, Ser. No. 499,442
9 Claims. (Cl. 267—1)

This invention relates to so-called hydraulic springs which perform hydraulically the functions of metallic springs such as, for example, die springs used in die sets for gripping workpiece stock during operation. The object of this invention is to provide a self-contained reciprocatory hydraulic spring which does not require connection to an external circuit or source of pressure fluid, either hydraulically or pneumatic, yet which is capable of performing the work of several metallic coil springs and does so with a fairly constant high pressure throughout its relatively long working stroke.

FIGURE 1 is a central vertical section through a self-contained reciprocatory hydraulic spring according to one form of the invention, with portions of the elongated cylinder omitted to conserve space, and with the parts shown in their starting positions at the beginning of a working stroke;

FIGURE 2 is a view similar to the left-hand end of FIGURE 1, but showing the parts in the positions which they occupy at the start of the return stroke; and FIGURE 3 is a cross-section taken along the line 3—3 in FIGURE 1.

Referring to the drawing in detail, FIGURE 1 shows a self-contained reciprocatory hydraulic spring, generally designated 10, according to one form of the invention as including an elongated cylinder 12 internally threaded at its opposite ends to receive cylinder heads 14 and 16 provided with sealing rings 18 and 20. The forward head 14 is provided with a central recess 22. Reciprocably mounted in the bore 24 of the cylinder 12 is a valved plunger 26 including a piston rod 28 having a central threaded axial hole 30 in its forward end threadedly receiving the end of a socket-headed bolt or Allen screw 32 carrying an enlarged washer 34. Slidably mounted on the exposed portion of the shank 36 of the bolt 32 which exposed portion of the shank 36 is slightly smaller in diameter than the portion threaded into the hole, is an axially-movable spring-valved hollow piston head 38 consisting of a flanged sleeve or cylindrical shell 40 having an inwardly-extending flange 42 at its forward end with an annular rearward valve seat surface 43 and internally-threaded at its rearward end to receive the externally-threaded radial portion 44 of a core 46 having a reduced diameter axial portion 48 extending forwardly from the radial portion 44. The radial portion 44 is provided with circumferentially-spaced U-shaped axially-extending fluid ports 50, four such ports being shown for convenience. Holes could be substituted for the U-shaped ports. The core 46 is provided with an enlarged central axial bore 52 sufficiently larger than the shank 36 of the bolt 32 to provide an axial fluid passageway 54 therethrough. The forward end of the reduced diameter portion 48 of the core 46 is provided with a plurality of notches 56 to permit radial flow of fluid when said forward end is in engagement with the washer 34 at the start of the return stroke, as shown in FIGURE 2. Tightly mounted upon the reduced diameter portion 48 of the core 46 near its forward end is an annular disc 58, and mounted between it and the flange 42 is a so-called Schnorr spring or Belleville washer 60 of annular frusto-conical shape having a periphery of smaller diameter than the bore 62 within the cylindrical shell 40 but of slightly larger diameter than the bore 64 within the flange portion 42, and having an inner diameter slightly greater than the reduced diameter portion 48 of the core 46. Several similar frusto-conical springs 60 are mounted in stacked relationship on the reduced diameter portion 48 of the core 46 on the rearward side of the annular disc 58.

Mounted on the piston rod 28 near the inner end 66 thereof are two internally and externally-sealed annular forward and rearward free pistons 68 and 70 respectively. To insure sealing, but with proper fluids, one such free piston would suffice. In the positions of the parts shown in FIGURE 1, the forward free piston 68 abuts the rearward end 72 of the flanged sleeve 40, whereas the rearward face of the rearward free piston 70 is engaged by the forward end of a heavy-duty medium-high-pressure retraction spring 73 in the chamber 75. The rearward end of the spring 73 engages the annular cylinder head 16. The rearward end of the piston rod 28 may be bored and threaded as at 74 for connection to the die pad or other machine element to be subjected to pressure by it.

It will be understood that the overall length of the cylinder 12 is a plurality of times the stroke of the valved plunger 26. For example, a cylinder length of 12⅜ inches with a two-inch bore has been found satisfactory for a four-inch stroke to a total overall length of 16½ inches in the extended position of FIGURE 1 between the outer ends of the cylinder head 14 and the outer end 76 of the piston rod 28. The working fluid in the left-hand end of the cylinder 12 is preferably a light hydraulic oil. The free pistons 68 and 70 are provided with beveled portions 78 at their outer and inner edges to permit proper seating and for self-adjustment by tilting slightly with the inner end of the retraction spring 73.

In the installation of the invention, let it be assumed that a plurality of the self-contained reciprocatory hydraulic springs 10 are mounted in the ram or upper part of a die set, such as in suitable vertical bores snugly receiving the cylinders 12, and that the piston rods 28 extend downward therefrom toward the hold-down pad or other portions of the die set or other machine element upon which pressure is to be exerted, connection being made by bolts or threaded portions entering the internally-threaded holes 74 in the ends of the piston rods 28, if so desired, or unconnected contacting engagement may be used. As the press ram descends, carrying with it the cylinders 12, the plungers 26 may be held stationary by the engagement of the lower or outer end 76 of the piston rod 74, with the work holder, or may float downward in a cushioned installation. Fluid in the upper or left-hand end chamber 80 of the cylinder 12 engages the foremost spring washer 60 and flexes it away from its contact with the valve seat surface 43 inside the flange 42, thereby causing fluid to pass through the piston head bore 62 and ports 50 to act against the floating or free pistons 68 and 70. This action moves the free pistons 68 and 70 rearwardly along the piston rod 28, at the same time compressing the retraction spring 73 and filling with hydraulic fluid the chamber 82 behind the piston head 38. This action continues until the end of the stroke of the cylinder 12 relatively to the substantially stationary piston rod 28 of each hydraulic spring 10 until the parts reach the relative positions shown in FIGURE 2.

In response to the retraction stroke of the press ram, each cylinder 12 of each hydraulic spring 10 moves upward while each piston rod 28 remains stationary, whereupon the energy stored in the retraction spring 73 pushes the free pistons 68 and 70 upward (to the left in FIGURES 1 and 2), forcing the fluid ahead of it out of the chamber 82, through the passageways 54 and 56 in the core 46 and through the opening 64 in the flange 42, past the washer 34 into the chamber 80, filling the latter as each cylinder 12 moves upward. At the end of the stroke, the working parts occupy the relative position shown in FIG- URE 1, with the chamber 80 filled with hydraulic fluid and with the free pistons 68 and 70 forced against the rearward end 72 of the hollow piston head 38.

Instead of employing the energy-storing retraction spring 73, it will be understood that an energy-storing volume of compressed gas may be sealed in the chamber 75, and retraction effected by the expansion of this compressed gas. The latter, of course, has been further compressed during the working stroke, by the travel of the free pistons 68 and 70. This arrangement, unlike certain prior devices, would not require any connection to an external source of compressed gas, such as compressed air, but would preferably be provided with a filling valve for replenishment of compressed gas lost by leakage over an extended period of time.

I claim:
1. A self-contained reciprocatory hydraulic spring, comprising
   a cylinder having a hydraulic fluid chamber in one end thereof adapted to contain hydraulic fluid,
   a plunger including a hollow piston head and a piston rod reciprocably mounted in said cylinder and projecting from one end thereof,
   a free piston mounted on said piston rod for reciprocation relatively thereto,
   resilient means within said cylinder yieldingly urging said free piston toward said hollow piston head,
      said hollow piston head having a fluid passageway therethrough leading from said hydraulic fluid chamber to said free piston,
   and spring-pressed valve means normally closing said passageway and responsive to the attainment of a predetermined pressure in said chamber for opening communication therethrough in response to motion of said piston head into said chamber.

2. A self-contained reciprocatory hydraulic spring, according to claim 1, wherein said resilient means includes an energy-storing helical compression spring mounted in said cylinder remote from said hydraulic fluid chamber.

3. A self-contained reciprocatory hydraulic spring, according to claim 1, wherein said hollow piston head is reciprocable relatively to said piston rod, and wherein abutment means is mounted on said piston rod in stroke-limiting relationship to said hollow piston head.

4. A self-contained reciprocatory hydraulic spring, according to claim 1, wherein said valve means includes a spring washer mounted in said hollow piston head, and wherein said hollow piston head has a valve seat engageable with said spring washer.

5. A self-contained reciprocatory hydraulic spring, according to claim 1, wherein said hollow piston head passageway includes a peripheral portion and a central portion spaced radially apart from one another.

6. A self-contained reciprocatory hydraulic spring, according to claim 3, wherein said hollow piston head includes an outer cylindrical shell and an internal core secured to said shell for travel therewith, and wherein said core contains a peripheral passageway normally yieldingly closed by said valve means and a central axial passageway normally closed during the compression stroke of said plunger by said abutment means and operable during the retraction stroke of said plunger in response to the retraction force exerted by said resilient means.

7. A self-contained reciprocatory hydraulic spring, according to claim 6, wherein said abutment means includes a stem secured to said piston rod and an enlargement on said stem remote from said piston rod, and wherein said central passageway surrounds said stem.

8. A self-contained reciprocatory hydraulic spring, according to claim 6, wherein said core has an elongated axial portion carrying said spring-pressed valve means and also has a radially-extending portion having said peripheral passageway extending therethrough into communication with said free piston.

9. A self-contained reciprocatory hydraulic spring according to claim 1, wherein said resilient means includes an energy-storing compressed gas disposed in said cylinder on the opposite side of said free piston from said hydraulic fluid chamber.

References Cited
FOREIGN PATENTS

| | | |
|---|---|---|
| 1,319,649 | 1/1963 | France. |
| 705,634 | 5/1941 | Germany. |
| 733,006 | 7/1955 | Great Britain. |

ARTHUR L. LA POINT, *Primary Examiner.*

R. M. WOHLFARTH, *Assistant Examiner.*